UNITED STATES PATENT OFFICE.

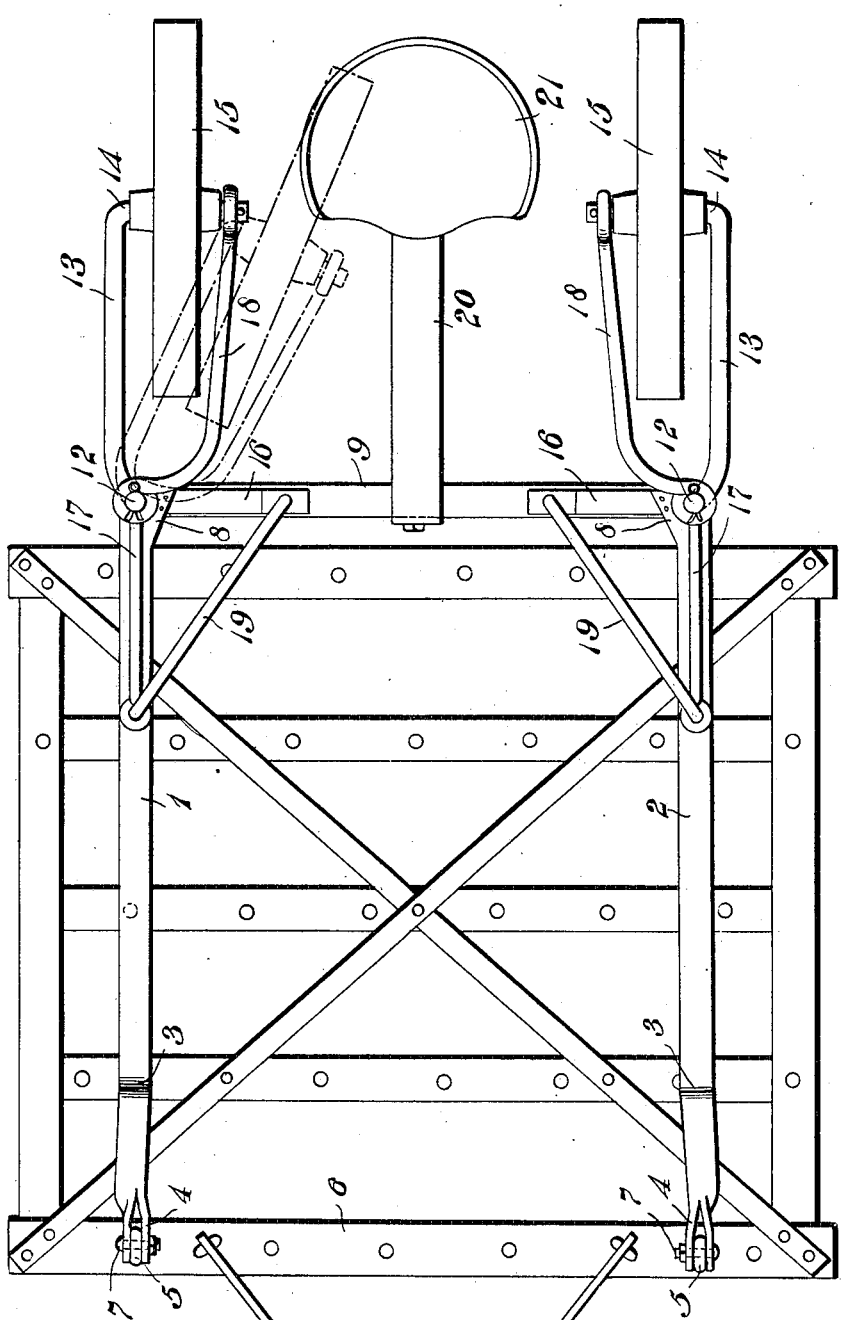

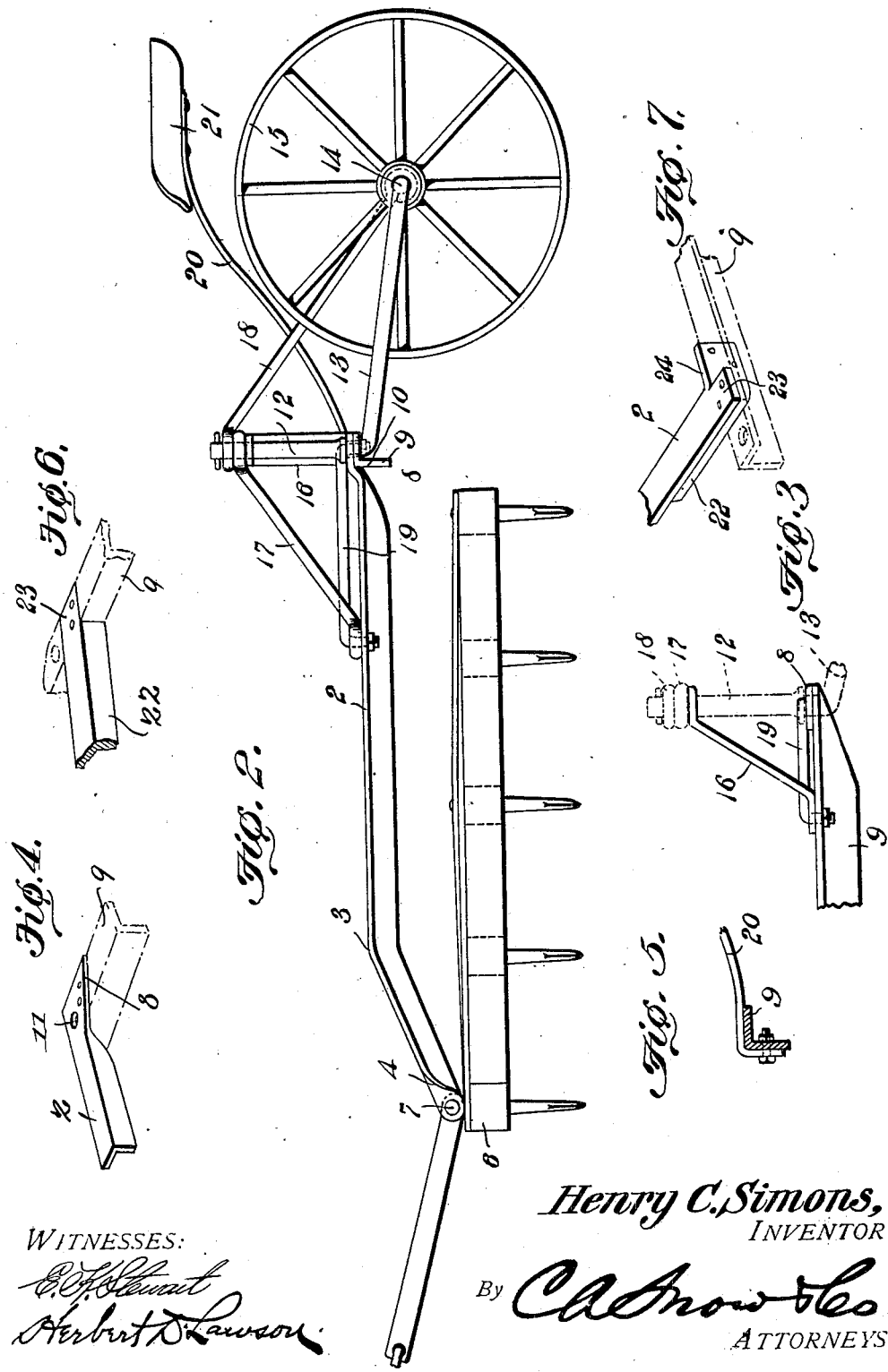

HENRY C. SIMONS, OF ODEBOLT, IOWA.

HARROW.

No. 825,872.

Specification of Letters Patent.

Patented July 10, 1906.

Application filed March 29, 1906. Serial No. 308,777.

*To all whom it may concern:*

Be it known that I, HENRY C. SIMONS, a citizen of the United States, residing at Odebolt, in the county of Sac and State of Iowa, have invented a new and useful Harrow, of which the following is a specification.

This invention relates to riding attachments for harrows and the like. Its object is to provide an attachment of this character which is of simple construction, durable, and which can be readily connected to the harrow or other like agricultural machine and will follow it without tending to drag the same out of its proper course.

Another object is to so arrange the parts that very little of the weight of the attachment will be received by the harrow.

With the above and other objects in view the invention consists of downwardly-curved draw-bars adapted to be connected at their forward ends to the drag-bar of a harrow, while their other ends are permanently connected by a cross-bar having upstanding braces adjacent its ends which with the cross-bar constitute bearings for rotatable arms formed at the front ends of rearwardly-extending angular axles on which the supporting-wheels of the attachment are mounted. These axles are braced in a novel manner, so as to prevent the same from becoming bent so as to throw the wheels out of proper position. The driver's seat is connected to the cross-bar, but is supported slightly in the rear of the centers of the wheels, so that the riding attachment will be practically balanced upon the wheels and substantially no weight applied to the harrow thereby.

The invention also consists of certain other novel features of construction and combinations of parts, which will be hereinafter more fully described, and pointed out in the claims.

In the accompanying drawings is shown the preferred form of the invention.

In said drawings, Figure 1 is a plan view of the attachment secured to a harrow. Fig. 2 is a side elevation. Fig. 3 is a detail view showing one end of the cross-bar and the bracket secured thereon, the axle-arm and its braces being shown by dotted lines. Fig. 4 is a detail view showing the manner of connecting the draw and cross bars, said cross-bar being shown in dotted lines. Fig. 5 is a section through the cross-bar, showing the manner of connecting the cross-bar and seat-spring; and Figs. 6 and 7 are detail views showing modified means for connecting the draw-bars to the cross-bar.

Referring to the figures by numerals of reference, 1 and 2 are draw-bars, each of which is preferably formed of angle-iron and has its front end curved downward, as shown at 3, and forked, as at 4, to receive an eye 5, extending from the drag-bar 6 of a harrow. The forks are adapted to be pivotally connected to the eyes by means of removable bolts 7. The horizontally-extending portions of the draw-bars are bent upward at their rear ends, so as to form tongues 8, adapted to extend over and to be bolted or otherwise secured to the end portions of a cross-bar 9, which is also formed of angle-iron.

An opening 11 is formed within each end of the cross-bar and also extends through the tongues 8. These openings receive arms 12, upstanding from the forward ends of L-shaped axles 13, the rear ends 14 of which extend toward the longitudinal center of the machine and have supporting-wheels 15 mounted upon them. Angular braces 16 are secured upon the cross-bar 9 near its ends and extend upward and embrace the upper portions of the arms 12, so as to form bearings therefor and hold said arms at all times in proper relation to the cross-bar. Forwardly-extending braces 17 are fastened to the draw-bars and extend around the arms 12 above the braces 16, and rearwardly-extending braces 18 also engage the upper portions of the arms and are fastened at their rear ends to the ends 14 of axles 13. These braces 17 and 18, together with the braces 16, hold the arms 12 at all times in proper relation to the cross-bar, and the rearwardly-extending braces 18 also serve to support the ends of the axles and strengthen them when subjected to the weight of the rider. Braces 19 connect the draw-bars 1 and 2 with the cross-bar 9 to rigidly hold said bars. A heavy spring-standard 20 is secured to the front face of the cross-bar 9 and bears on the top thereof, and this spring supports a seat 21 at a point in rear of the axle ends 14, so that when a driver is mounted upon the attachment his weight will tend to counterbalance the weight of the forward portion of the attachment, and therefore the harrow will be subjected to practically no pressure from the attachment. This attachment is adapted to be placed in rear of a harrow, and the forked ends of the draw-bars are then secured to the drag-bar 6 in the manner heretofore described. When the harrow is drawn forward, the riding attachment will be pulled thereafter, and the arms 12 will serve as pivots for the axles 13. The wheels 15 are therefore free to swing to either side, so as to enable the attachment to follow after the harrow without pulling it out of its proper course, and the wheels are also capable of more readily moving over obstructions by reason of the lateral swinging movement of which they are capable.

While I have shown particular forms and arrangements of braces, it is to be understood that these forms may be varied as to shape and size, it merely being necessary to utilize braces for holding the arms 12 in fixed relation to the cross-bar 9 and for reinforcing the ends of the axles 13. Importance is attached to the fact that the arms 12 extend through the draw-bars as well as through the cross-bars, because with this arrangement the pull exerted by the draw-bars is applied directly to the arms and not to any means for securing the draw-bars to the cross-bars.

If preferred, instead of flattening the rear ends of the draw-bars, as shown in Figs. 1 to 4, the depending portions 22 of said draw-bars can be cut away at their rear ends, so as to form tongues 23, which overlap the cross-bar and are fastened thereto at points removed from the ends of the cross-bar, so that it will be unnecessary to extend the arms 12 through the tongues 23. This construction has been illustrated in Fig. 6. Instead of cutting away the rear ends of the depending portions 22 of the draw-bars said ends can be slit, so that the depending portion can form a laterally-projecting tongue 24, to be bolted upon the front face of the cross-bar 9. In both constructions shown in Figs. 6 and 7 it will of course be inadvisable to extend the arms 12 through the draw-bars, because said bars are ordinarily of very light construction, and the formation of an opening through them would weaken them unless they were flattened, as shown in Figs. 1 to 4.

What is claimed is—

1. A riding attachment for harrows and the like comprising a cross-bar formed of angle-iron, wheels connected thereto and capable of swinging laterally, curved draw-bars formed of angle-irons and forked at one end, the rear ends of the draw-bars forming tongues which overlap and are secured to the cross-bar, braces connecting the cross-bar and draw-bars, and a seat supported by the cross-bar in rear of the centers of the wheels.

2. A riding attachment for harrows comprising a cross-bar, draw-bars connected thereto, rotatable arms connected to and upstanding from the cross-bar, braces for holding said arms in fixed relation to the cross-bar, angular axles extending rearwardly from the arms, and supporting-wheels upon said axles.

3. A riding attachment for harrows comprising a cross-bar, draw-bars connected thereto, rotatable arms connected to and upstanding from the cross-bar, braces for holding said arms in fixed relation to the cross-bar, angular axles extending rearwardly from the arms, supporting-wheels upon said axles, and bracing means connecting the arms with the free ends of their axles.

4. A riding attachment for harrows comprising a cross-bar, draw-bars connected thereto the overlapping portions of said bars being apertured, arms rotatably mounted within the apertures, braces upon the bars for holding the arms in fixed relation with the cross-bar, angular axles extending rearwardly from the arms, and supporting-wheels carrying the axles.

5. A riding attachment for harrows comprising a cross-bar, draw-bars connected thereto, the overlapping portions of said bars being apertured, arms rotatably mounted within the apertures, braces upon the bars for holding the arms in fixed relation with the cross-bar, angular axles extending rearwardly from the arms, supporting-wheels carrying the axles, and reinforcing devices connecting the arms with the rear ends of their axles.

In testimony that I claim the foregoing as my own I have hereto affixed my signature in the presence of two witnesses.

HENRY C. SIMONS.

Witnesses:
J. W. McIntosh,
A. E. Baker.